United States Patent [19]
Ziv-Av

[11] Patent Number: 5,922,370
[45] Date of Patent: Jul. 13, 1999

[54] CLAMPING ASSEMBLY FOR INJECTION MOLDING APPARATUS

[76] Inventor: Amir Ziv-Av, 3 Hanasi, Kiryat Ono, Israel

[21] Appl. No.: 08/907,023

[22] Filed: Aug. 6, 1997

[51] Int. Cl.[6] .................................................. B29C 45/64
[52] U.S. Cl. ........................ 425/589; 100/231; 425/451.9; 425/595
[58] Field of Search ..................................... 425/589, 593, 425/595, 450.1, 451.9; 100/231, 258 A

[56] References Cited

U.S. PATENT DOCUMENTS

| | | | |
|---|---|---|---|
| 5,249,951 | 10/1993 | Leonhartsberger et al. | 425/589 |
| 5,354,196 | 10/1994 | Ziv-Av | 425/589 |
| 5,556,656 | 9/1996 | Lampl et al. | 425/451.9 |
| 5,578,329 | 11/1996 | Hehl | 425/450.1 |
| 5,633,024 | 5/1997 | Ziv-Av | 425/589 |
| 5,650,182 | 7/1997 | Fuller et al. | 425/595 |
| 5,700,502 | 12/1997 | Hehl | 425/595 |

*Primary Examiner*—James P. Mackey
*Attorney, Agent, or Firm*—Mark M. Friedman

[57] ABSTRACT

A clamping assembly for an injection molding apparatus features a double-framed platen unit including a fixed platen, a positioning frame and a clamping frame. Both the positioning and clamping frames are rigidly attached to, or integrally formed with, the fixed platen, but they are otherwise generally mechanically independent of each other. A sliding platen is associated with a linear bearing mounted on the positioning frame so as to be slidable relative to the fixed platen. The clamping frame is configured to receive a drive mechanism for exerting force on the sliding platen towards the fixed platen.

11 Claims, 6 Drawing Sheets

CLAMPING ASSEMBLY FOR INJECTION MOLDING APPARATUS

FIELD AND BACKGROUND OF THE INVENTION

The present invention relates to clamping assemblies for injection molding apparatus, and, more particularly, to structures which ensure that the two portions of the injection molding mold remain together during the injection of molten plastic.

A typical injection molding machine features a fixed platen and a complementary movable platen. The two platens are designed to come together so as to form between them a multi-part, typically a two-part, mold. The two platens are pressed together through the use of a suitable driven ram, such as a hydraulic piston or toggle mechanism, and the like. With the two parts of the mold held firmly together, a molten plastic is injected under great pressure into the mold, thereby filling it. Once the plastic has cooled and hardened, the two parts of the mold are separated and the finished item is removed prior to repetition of the cycle.

Because of the high pressures under which the molten plastic is injected it is imperative that the two parts of the mold be very firmly and accurately held together. Thus, in order to prevent the escape of molten plastic and the attendant deterioration in the quality of the injection molded product, and in order to safeguard the mold itself, it is essential that the two parts remain accurately aligned with each other both while the two parts are pushed together and under application of high pressure.

For many years, and to a large extent even today, the accurate alignment of the fixed and movable platens was assured through the use of four tiebars. In other words, the square or rectangular movable platen features openings, typically near each of its four corners. Each opening slidably accommodates a tiebar which is firmly attached to the fixed platen. The movable platen is thus slidably supported by the tiebars which assure the proper alignment of the two platens even when the two platens are forced together under great pressure. In some cases, additional support is provided for the platens.

While the tiebars are effective in preserving the alignment of the platens, they do so at great cost. Thus, the presence of the tie bars in the region of the mold significantly reduces the portion of the mold available for molding and, perhaps more importantly, considerably complicates the manual or automatic removal of the product as well as the changing of the molds.

Several attempts have been made to provide an injection molding clamping assembly which dispenses with the troublesome tiebars. One of these is disclosed in U.S. Pat. No. 5,354,196 to Ziv-Av et al.

U.S. Pat. No. 5,354,196 discloses a clamping assembly which includes a base to which the fixed platen is connected and a clamping structure which nests within the base and which supports the movable platen. The base and clamping structure are arranged so that when pressure is applied to force the two platens together, the clamping structure absorbs the force, keeping the base from bending and ensuring a tight fit between the two platens.

This system maintains exact alignment between the platens by providing a double structure in which the base is isolated from the deforming effects of the clamping forces. Transmission of the clamping forces to the platens is achieved through two pivotal joints.

While this configuration represents a great improvement over the tiebar-based approach, the structure is somewhat complex and presents a number of practical limitations. Most notably, it has been found difficult to provide pivotal joints to reliably transmit the huge clamping forces required while preserving rotational freedom between the base and clamping structure.

In an alternative embodiment, U.S. Pat. No. 5,354,196 discloses a clamping system in which a single elongated base frame both absorbs the clamping forces and serves as a base for sliding bearings to preserve accurate alignment of the platens. Precision is achieved by generating a limited region of deformation remote from the sliding bearings.

The latter configuration avoids the shortcomings of the previously mentioned pivotal joints. However, the greatly extended base frame length required to achieve the isolation of the bearings from the region of deformation renders the system somewhat impractical. Furthermore, the positioning of the bearings remotely from the actual clamping position leads to a serious reduction in the accuracy of the clamping.

There is therefore a need for, and it would be highly advantageous to have, a reliable and tiebar-less clamping assembly for use in an injection molding apparatus which effectively maintains precise alignment of the platens without requiring pivotal connections or excessive size.

SUMMARY OF THE INVENTION

The present invention is a clamping assembly for an injection molding apparatus which employs a double-framed platen unit.

According to the teachings of the present invention there is provided, a clamping assembly for an injection molding apparatus comprising: (a) a double-framed platen unit including: (i) a fixed platen, (ii) a positioning frame having a linear bearing, and (iii) a clamping frame, the fixed platen, the positioning frame and the clamping frame being rigidly interconnected in a region adjacent to the fixed platen, the positioning frame being otherwise substantially mechanically independent of the clamping frame; and (b) a sliding platen associated with the linear bearing so as to be slidable relative to the fixed platen, the clamping frame being configured to receive a drive mechanism for exerting force on the sliding platen towards the fixed platen.

According to a further feature of the present invention, the fixed platen has a front clamping surface, the linear bearing being located in front of the front clamping surface.

According to a further feature of the present invention, there is also provided a drive mechanism connected between the clamping frame and the slidable platen, wherein the drive mechanism is configured so as to apply force to the slidable platen in a direction parallel to a direction of movement of the linear bearing substantially independent of small displacements of the sliding platen relative to the drive mechanism in a direction perpendicular to the direction of movement.

According to a further feature of the present invention, there is also provided a drive mechanism including a linear ram rod, the drive mechanism being pivotally mounted on the clamping frame.

According to a further feature of the present invention, the drive mechanism is pivotally mounted relative to the clamping frame by interposition of a flexible linkage between the drive mechanism and the clamping frame.

According to a further feature of the present invention, there is also provided a pivotal linkage between the drive mechanism and the sliding platen.

According to a further feature of the present invention, there is also provided a drive mechanism rigidly mounted on the clamping frame, the drive mechanism including a linear ram rod, the ram rod terminating in a rolling joint.

According to a further feature of the present invention, there is also provided a drive mechanism connecting between the clamping frame and the sliding platen, the drive mechanism including a toggle mechanism.

According to a further feature of the present invention, the clamping frame extends beyond the positioning frame such that the clamping frame forms a base of the double-framed platen unit.

According to a further feature of the present invention, the positioning frame extends beyond the clamping frame such that the positioning frame forms a base of the double-framed platen unit.

According to a further feature of the present invention, there is also provided a non-rigid support interposed between the positioning frame and the clamping frame for providing additional support for the clamping frame.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a clamping assembly for an injection molding apparatus which employs a double-framed platen unit.

The principles and operation of clamping assemblies according to the present invention may be better understood with reference to the drawings and the accompanying description.

Figure 1:
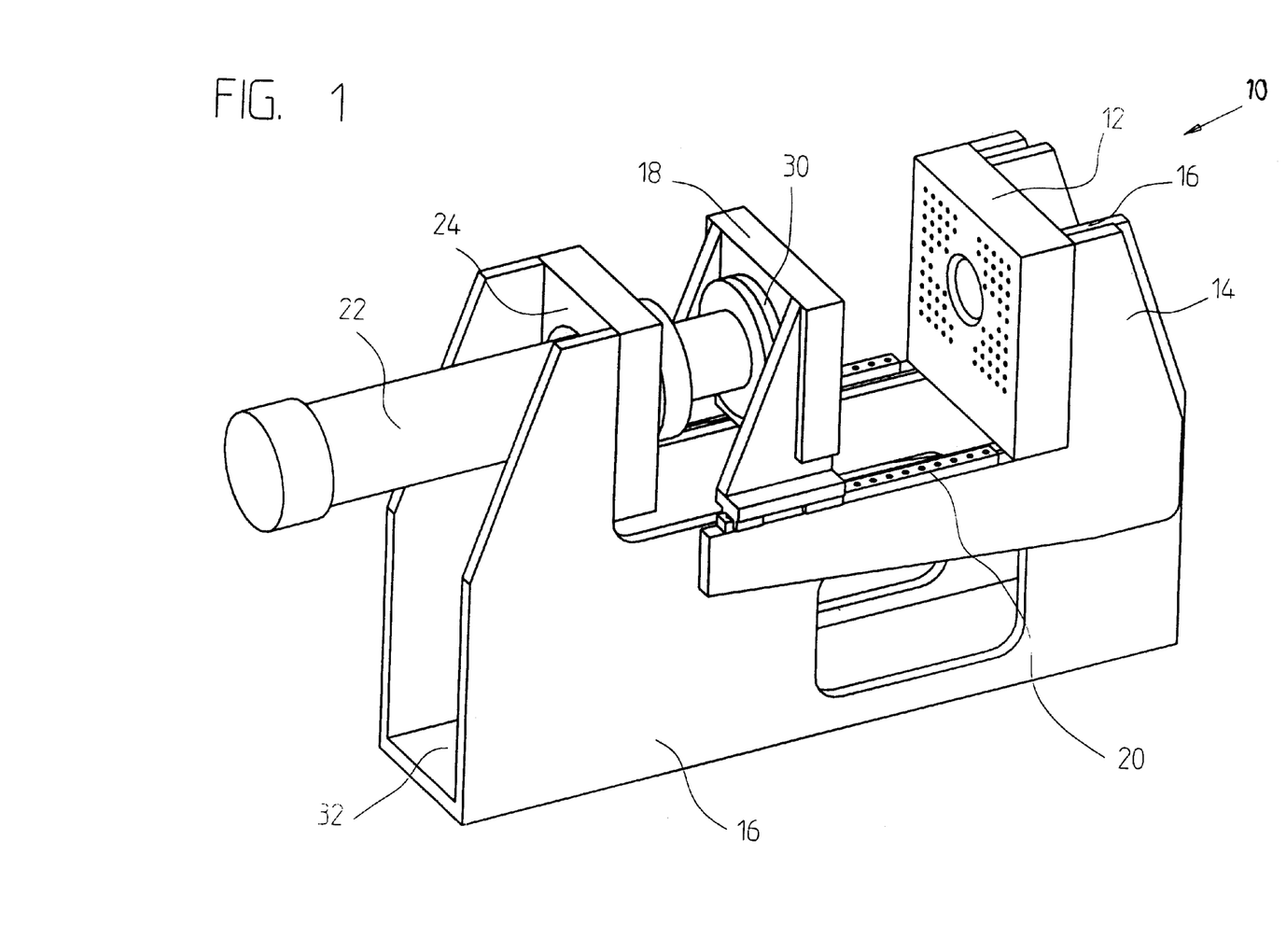
FIG. 1 is a perspective view of a first embodiment of a clamping assembly, constructed and operative according to the teachings of the present invention, for use in an injection molding apparatus.
Figure 2:
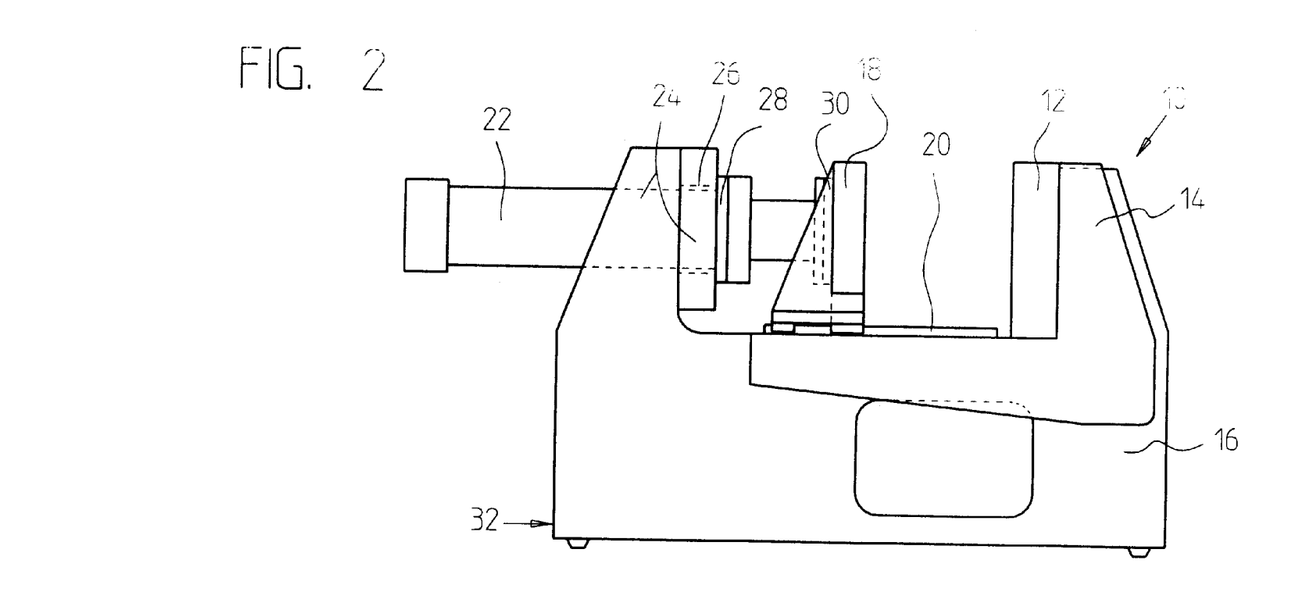
FIG. 2 is a side view of the clamping assembly of FIG. 1.
Figure 3:
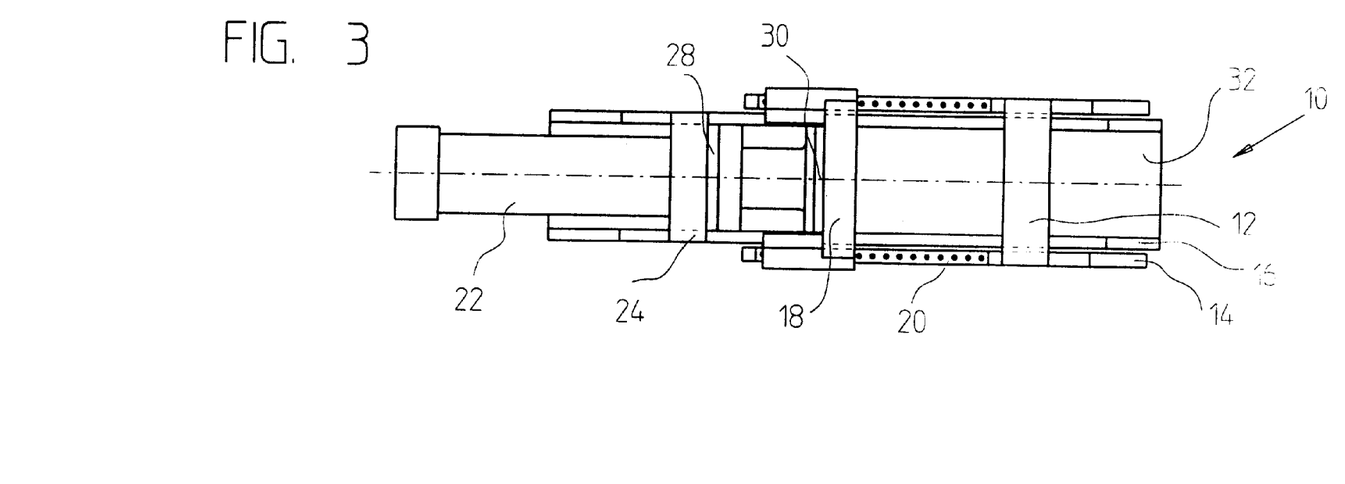
FIG. 3 is a top view of the clamping assembly of FIG. 1.

Referring now to the drawings, FIGS. 1–3 show a first embodiment of a clamping assembly, generally designated 10, constructed and operative according to the teachings of the present invention, for use in an injection molding apparatus.

Generally speaking, clamping assembly 10 has a double-framed platen unit made up of a fixed platen 12, a positioning frame 14 and a clamping frame 16. Fixed platen 12, positioning frame 14 and clamping frame 16 are all rigidly interconnected in a region adjacent to fixed platen 12, typically through both positioning frame 14 and clamping frame 16 being attached to, or integrally formed with, fixed platen 12. Except for this region near platen 12, however, positioning frame 14 and clamping frame 16 are substantially mechanically independent of each other. A sliding platen 18 is slidable along a linear bearing 20 which is mounted on positioning frame 14 so as to be slidable relative to fixed platen 12. Clamping frame 16 is configured to receive a drive mechanism 22 for exerting force on sliding platen 18 towards fixed platen 12.

It will be readily apparent that clamping assembly 10 provides a number of advantages and simplifications over conventional clamping assemblies. By providing a double frame platen unit, the high-precision positioning frame is isolated from any deformations which may occur in the clamping frame due to clamping forces. At the same time, with the possible exception of drive mechanism 22 which will be addressed below, pivotal connections are avoided without requiring increased dimensions.

The interconnection between fixed platen 12, positioning frame 14 and clamping frame 16 may be achieved in a number of ways. In the typical implementations illustrated, positioning frame 14 and clamping frame 16 are both directly attached to fixed platen 12, with or without some additional direct connection between them. However, an equivalent effect could be achieved by connecting positioning frame 14 and clamping frame 16 to each other and connecting fixed platen 12 to one or other of the frames. In all these cases, attachment may be achieved by any known rigid coupling or welding operation. Additionally, any two, or all three, of these components may be integrally formed together as a single unit.

It should be noted that the phrase "substantially mechanically independent" is used herein in the description and claims to refer to structures which are sufficiently mechanically independent that clamping deformation of one structure does not cause deformation in the other. Thus, the clamping and positioning frames described in this way may be connected together directly, at or near their point of connection to fixed platen 12. Furthermore, as will be illustrated below with reference to FIGS. 5–7, additional connections between the two frames remote from their point of connection to platen 12 may also be achieved without compromising the required mechanical independence. To this end, any additional connections must have sufficient freedom of play or flexibility to avoid transmitting significant clamping deformation forces from clamping frame 16 to positioning frame 14.

Turning now to the features of clamping assembly 10 in more detail, it is a particular feature of most preferred embodiments of the present invention that positioning frame 14 and clamping frame 16 are co-extensive or overlapping, being formed as a compact nested structure. In the examples shown, positioning frame 14 is exterior to clamping frame 16, although this configuration could be reversed.

Each frame typically has two vertically deployed sheets, each of which may be formed with cut-outs. In the example shown, positioning frame 14 which experiences relatively small forces is implemented as two separate, relatively small, L-shaped brackets.

To ensure compactness as well as positioning accuracy, linear bearing 20 is preferably mounted on positioning frame 14 in front of, and proximal to, the front clamping surface of fixed platen 12. In other words, if one considers a plane corresponding to the predominant plane of the front clamping surface of fixed platen 12, linear bearing 20 lies to the same side of the plane as sliding platen 18. Thus, sliding platen 18 is immediately adjacent to linear bearing 20, thereby achieving maximum precision possible.

In this embodiment of clamping Assembly 10, clamping frame 16 extends downwards beyond positioning frame 14 and features a horizontal base element 32. Clamping frame 16 thus serves as a base through which the double-framed platen unit is supported. Preferably, localized feet are deployed between base element 32 and an underlying surface so that the assembly remains stable even when clamping frame 16 undergoes slight clamping deformation.

Drive mechanism 22 may be any type of drive mechanism capable of providing the forces required for a given application, as is known in the art. A bracket 24, adapted to receive the appropriate type of drive mechanism 22, is provided in the part of clamping frame 16 remote from fixed platen 12.

As stated above, it is an objective of the present invention that any clamping deformation resulting from the clamping forces exerted by drive mechanism 22 is limited to clamping frame 16 and does not affect positioning frame 14. As a result, it will be clear that clamping deformation will cause some amount of relative movement and misalignment between bracket 24 and sliding platen 18. Drive mechanism 22 and/or its attachment to clamping frame 16 and sliding platen 18 must be configured to accommodate this slight misalignment.

One implementation of drive mechanism 22 employs a linear ram rod, such as the hydraulic piston illustrated. The phrase "linear ram rod" is used herein to refer to any drive mechanism in which the actuation involves linear movement along the axis of a ram rod. In this case, in order to accommodate the aforementioned misalignment of bracket 24 relative to sliding platen 18, drive mechanism 22 is pivotally mounted on clamping frame 16 and pivotally linked to sliding platen 18.

It should be noted that the term "pivotal" is used in this context to relate to any joint or connection which permits some degree of rotational freedom, and does not necessarily imply the presence of any element which could be referred to as a "pivot", per se. Since the extent of the misalignment is usually small, these pivotal connections need only provide a relatively small degree of pivotal freedom.

Thus, in the example shown here, sufficient pivotal freedom is achieved by providing a spacer of elastomeric material, best seen in FIG. 2. Specifically, drive mechanism 22 is positioned within a slightly oversized socket 26 of bracket 24, supported by an interposed elastomeric spacing element 28. Similarly, attachment of the end of the linear ram rod to the back of sliding platen is implemented through a pad 30 of elastomeric material.

Figure 4:
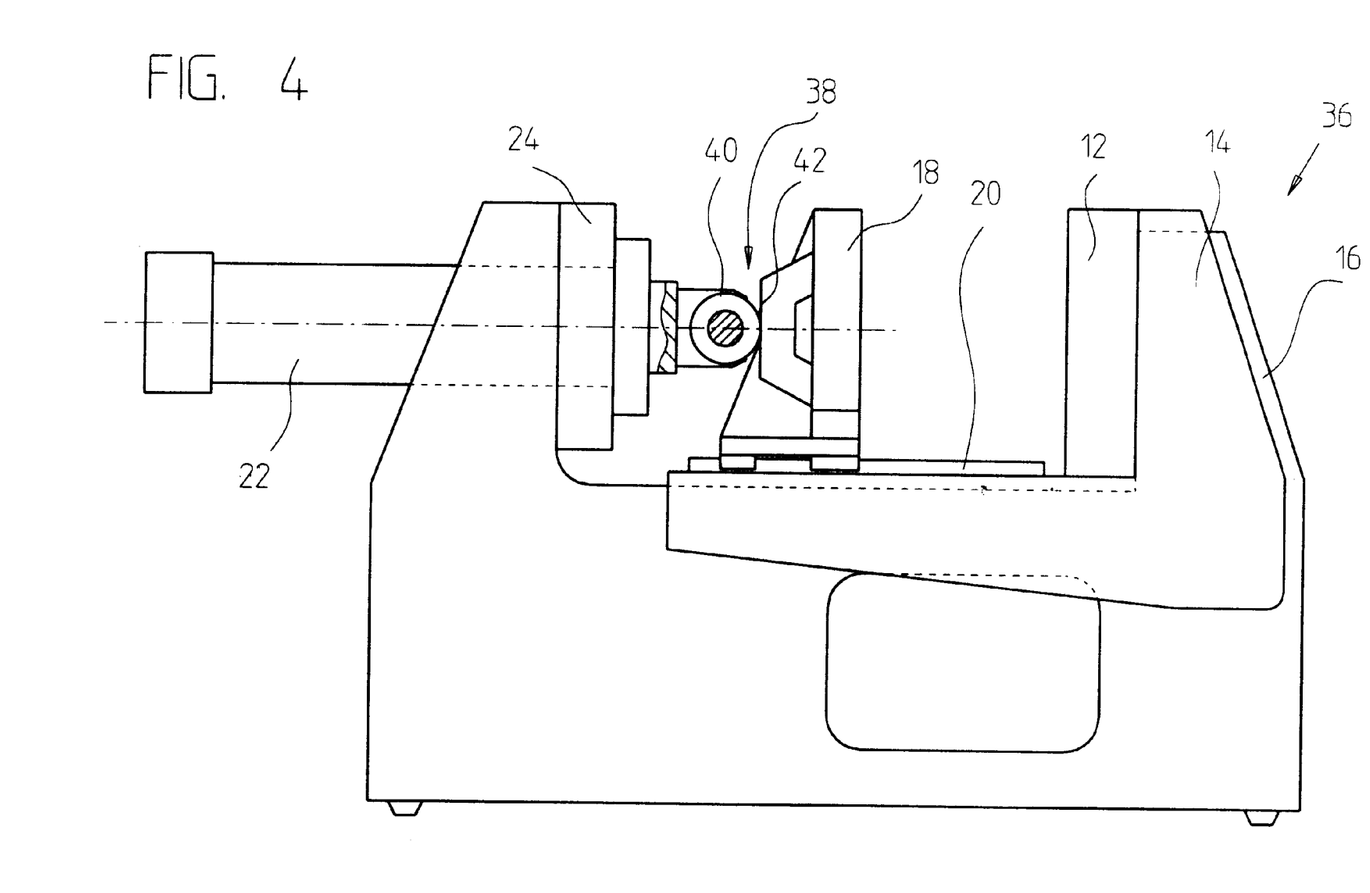
FIG. 4 is a side view of a second embodiment of a clamping assembly, constructed and operative according to the teachings of the present invention, employing a roller joint.

Turning now to FIG. 4, there is shown a second embodiment of a clamping assembly, generally designated 36, constructed and operative according to the teachings of the present invention. Clamping assembly 36 is generally similar to clamping assembly 10, equivalent elements being designated similarly. This embodiment differs primarily in that it provides an alternative linkage for overcoming the aforementioned problem of alignment between drive mechanism 22 and sliding platen 18.

More specifically, the drive mechanism 22 of clamping assembly 36 is also implemented as a linear ram rod, this time rigidly mounted in abutment with bracket 24. Variations in alignment between bracket 24 and sliding platen 18 are accommodated by a rolling joint 38.

The term "rolling joint" as used here refers to an abutment between two elements configured so as to allow transfer of large forces perpendicular to the contact surfaces while providing low resistance to relative movement of the elements in a direction parallel to the contact surfaces. The term "rolling joint" is chosen as descriptive of this function, but does not necessarily imply the presence of any element which could be described as a "roller", per se.

This generalization notwithstanding, the specific example of rolling joint 38 illustrated here does in fact employ a roller 40 mounted at the end of the ram rod. Sliding platen 18 is formed with a corresponding rear face 42. This arrangement readily allows vertical movement of roller 40 while maintaining effective engagement for transfer of forces along the line of linear bearing 20.

Figure 5:
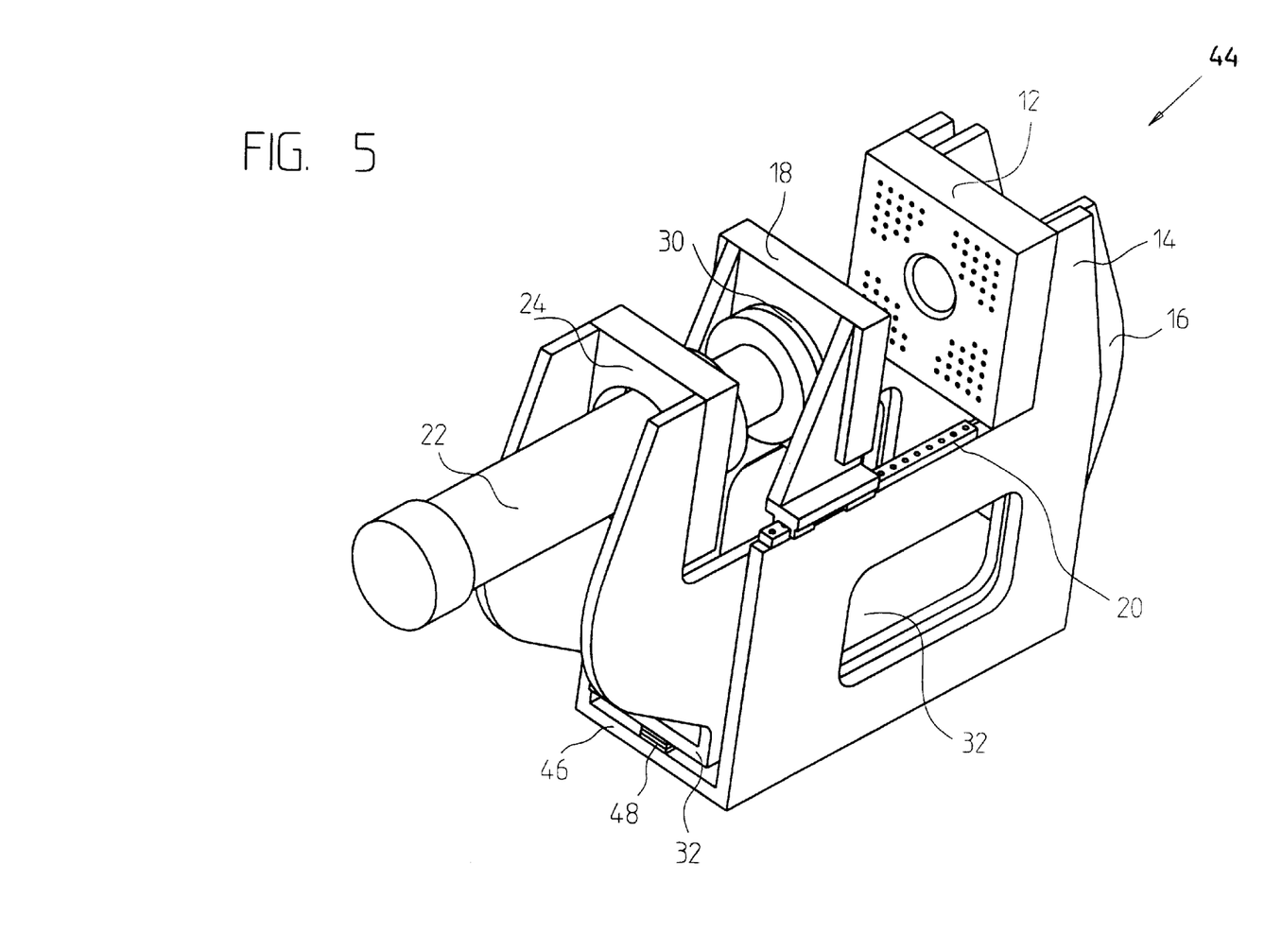
FIG. 5 is a perspective view of a third embodiment of a clamping assembly, constructed and operative according to the teachings of the present invention.
Figure 6:
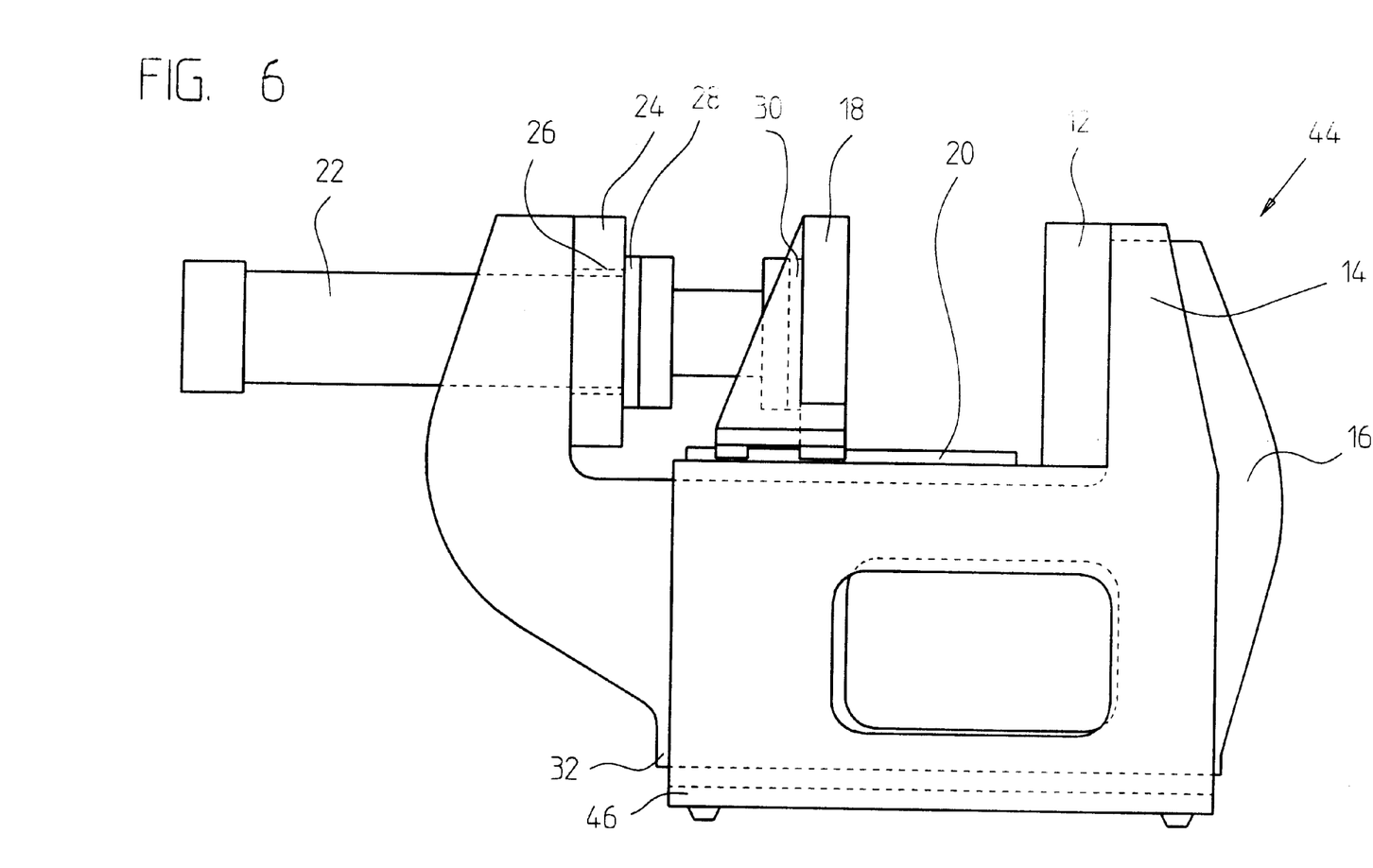
FIG. 6 is a side view of the clamping assembly of FIG. 5.

Turning now to FIGS. 5 and 6, there is shown a third embodiment of a clamping assembly, generally designated 44, constructed and operative according to the teachings of the present invention. Clamping assembly 44 is generally similar to clamping assembly 10, equivalent elements being designated similarly. This embodiment differs primarily in that here it is positioning frame 14 which extends beyond clamping frame 16 to form a base 46 of the double-framed platen unit.

This feature is of particular significance where precise location of the platens must be defined relative to an underlying surface for interaction with external machines such as robots. In this case, it is advantageous to use the positioning frame structure which is isolated from clamping deformation to support the clamping assembly, thereby ensuring that the position of the fixed platen constitutes a constant reference position relative to the underlying surface independent of the applied clamping force.

It will be noted that the weight of clamping frame 16 in this embodiment is essentially suspended from fixed platen 12 which is itself supported by positioning frame 14. Given that these components are designed to withstand very great forces of orders of magnitude greater than their own weight, this suspended structure is not particular problematic. However, optionally, a spring element 48 may be interposed between positioning frame 14 and clamping frame 16 to provide additional support for clamping frame 16 at a position remote from fixed platen 12. Spring element 48 is selected to be strong enough to provide significant additional support for the weight of clamping frame 16 while being sufficiently flexible to ensure that any clamping deformation in clamping frame 16 does not transfer significant deforming forces to positioning frame 14.

In all other respects, the structure and function of clamping assembly 44 may be understood by analogy with clamping assembly 10 described above.

Figure 7:
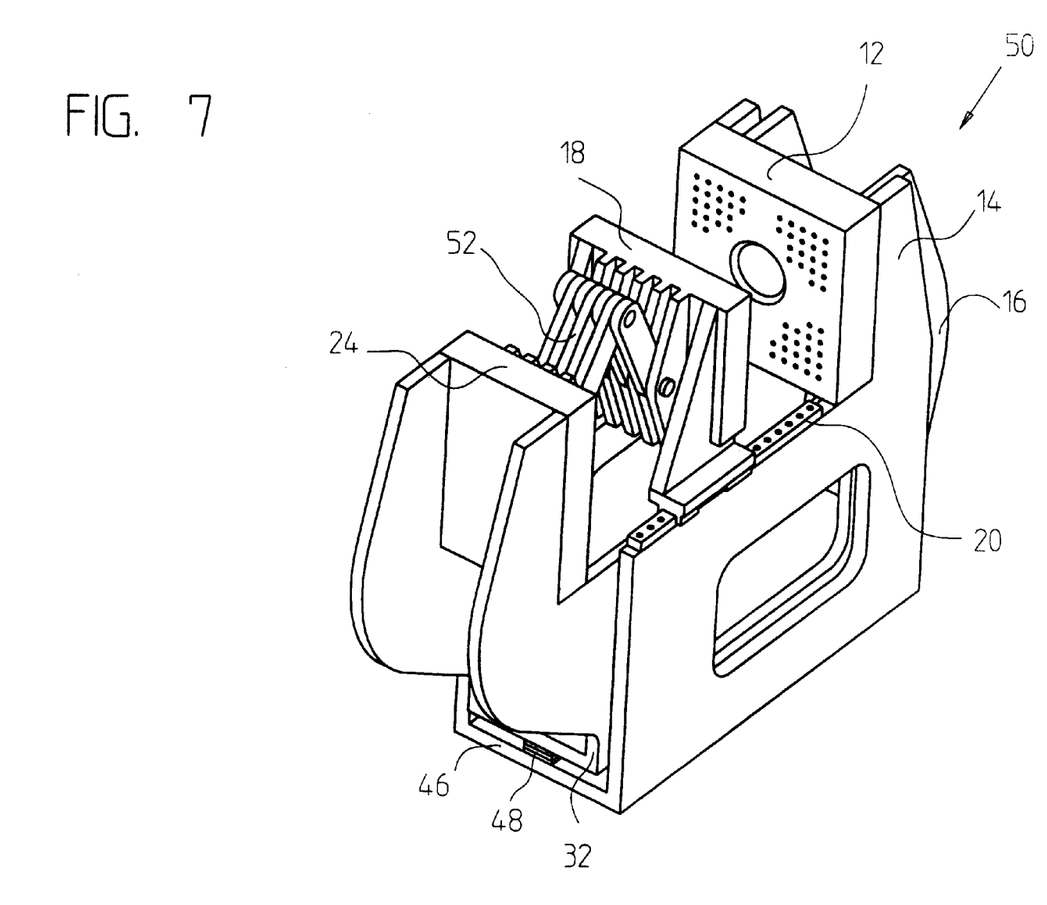
FIG. 7 is a perspective view of a fourth embodiment of a clamping assembly, constructed and operative according to the teachings of the present invention.

Turning now to FIG. 7, there is shown a fourth embodiment of a clamping assembly, generally designated 50, constructed and operative according to the teachings of the present invention. Clamping assembly 50, generally similar to clamping assembly 44, replaces the linear ram rod mechanism with a toggle mechanism 52. It will be readily apparent that the hinged structure of toggle mechanism 52 inherently accommodates any variations of vertical alignment between bracket 24 and sliding platen 18 such that no additional compensation measures are required. In all other respects, the structure and function of clamping assembly 50 may be understood by analogy with clamping assembly 44 described above.

It will be appreciated that the above descriptions are intended only to serve as examples, and that many other embodiments are possible within the spirit and the scope of the present invention.

What is claimed is:

1. A clamping assembly for an injection molding apparatus comprising:
   (a) a double-framed platen unit including
      (i) a fixed platen,
      (ii) a positioning frame having a linear bearing, and
      (iii) a clamping frame, said fixed platen, said positioning frame and said clamping frame being rigidly interconnected in a non-pivotal manner in a region adjacent to said fixed platen, said positioning frame being otherwise substantially mechanically independent of said clamping frame; and
   (b) a sliding platen associated with said linear bearing so as to be slidable relative to said fixed platen;
   said clamping frame being configured to receive a drive mechanism for exerting force on said sliding platen towards said fixed platen.

2. The clamping assembly of claim 1, wherein said fixed platen has a front clamping surface, said linear bearing being located in front of said front clamping surface.

3. The clamping assembly of claim 1, further comprising a drive mechanism connected between said clamping frame and said sliding platen, wherein said drive mechanism is configured so as to apply force to said sliding platen in a direction parallel to a direction of movement defined by said linear bearing substantially independent of small displacements of said sliding platen relative to said drive mechanism in a direction perpendicular to said direction of movement.

4. The clamping assembly of claim 1, further comprising a drive mechanism including a linear ram rod, said drive mechanism being pivotally mounted on said clamping frame.

5. The clamping assembly of claim 4, wherein said drive mechanism is pivotally mounted relative to said clamping frame by interposition of a flexible linkage between said drive mechanism and said clamping frame.

6. The clamping assembly of claim 4, further comprising a pivotal linkage between said drive mechanism and said sliding platen.

7. The clamping assembly of claim 1, further comprising a drive mechanism rigidly mounted on said clamping frame, said drive mechanism including a linear ram rod, said ram rod terminating in a rolling joint.

8. The clamping assembly of claim 1, further comprising a drive mechanism connecting between said clamping frame and said sliding platen, said drive mechanism including a toggle mechanism.

9. The clamping assembly of claim 1, wherein said clamping frame extends beyond said positioning frame such that said clamping frame forms a base of said double-framed platen unit.

10. The clamping assembly of claim 1, wherein said positioning frame extends beyond said clamping frame such that said positioning frame forms a base of said double-framed platen unit.

11. The clamping assembly of claim 10, further comprising a non-rigid support interposed between said positioning frame and said clamping frame for providing additional support for said clamping frame.

* * * * *